US012570382B2

(12) United States Patent
Ikegaya

(10) Patent No.: US 12,570,382 B2
(45) Date of Patent: Mar. 10, 2026

(54) MARINE PROPULSION SYSTEM AND MARINE VESSEL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 272 days.

(21) Appl. No.: 18/072,769

(22) Filed: Dec. 1, 2022

(65) Prior Publication Data

US 2023/0202633 A1 Jun. 29, 2023

(30) Foreign Application Priority Data

Dec. 24, 2021 (JP) ................................. 2021-210439

(51) Int. Cl.
| | |
|---|---|
| *B63H 20/12* | (2006.01) |
| *B63H 20/00* | (2006.01) |
| *B63H 20/02* | (2006.01) |
| *G05D 1/00* | (2006.01) |

(52) U.S. Cl.
CPC ........... *B63H 20/12* (2013.01); *B63H 20/007* (2013.01); *B63H 20/02* (2013.01); *G05D 1/0206* (2013.01); *B63H 2020/003* (2013.01)

(58) Field of Classification Search
CPC ...... B63H 20/12; B63H 20/007; B63H 20/02; B63H 2020/003; B63H 2021/205; B63H 2021/216; G05D 1/0206
See application file for complete search history.

(56) References Cited

U.S. PATENT DOCUMENTS

| | | | | |
|---|---|---|---|---|
| 4,412,500 | A | * | 11/1983 | Krautkremer .............. B63J 3/02 440/5 |
| 5,362,263 | A | * | 11/1994 | Petty ...................... B63H 25/04 440/1 |
| 11,827,319 | B1 | * | 11/2023 | Perdomo Tornbaum .................... B63B 79/40 |
| 2004/0227484 | A1 | | 11/2004 | DePasqua |
| 2006/0234566 | A1 | * | 10/2006 | Ando ......................... B63J 3/02 440/1 |
| 2008/0064273 | A1 | | 3/2008 | Mizokawa |
| 2009/0142974 | A1 | * | 6/2009 | Strobel .................. B63H 20/02 440/63 |

(Continued)

FOREIGN PATENT DOCUMENTS

| | | |
|---|---|---|
| JP | 2006-291927 A | 10/2006 |
| JP | 2008-62905 A | 3/2008 |

(Continued)

OTHER PUBLICATIONS

Extended European Search Report in EP22215535.0, mailed Jun. 7, 2023, 5 pages.

*Primary Examiner* — Abdalla A Khaled
(74) *Attorney, Agent, or Firm* — Keating & Bennett, LLP

(57) ABSTRACT

A marine propulsion system includes a controller configured or programmed to perform an electric drive control to cause an electric motor to drive an auxiliary thruster in an auxiliary propulsion device and having a minimum output smaller than a minimum output of a main thruster without performing an engine drive control to cause an engine to drive the main thruster in a main propulsion device when adjusting a thrust of a marine vessel to less than a troll thrust.

18 Claims, 6 Drawing Sheets

(56)                    References Cited

U.S. PATENT DOCUMENTS

| | | | | |
|---|---|---|---|---|
| 2011/0009017 A1* | 1/2011 | Winiski | ................. | B63H 20/12 |
| | | | | 440/62 |
| 2012/0247381 A1* | 10/2012 | Winiski | ................. | B63H 20/12 |
| | | | | 114/144 R |
| 2014/0012440 A1 | 1/2014 | Inoue | | |
| 2016/0039503 A1* | 2/2016 | Kinoshita | ............. | B63H 11/113 |
| | | | | 415/35 |
| 2019/0118922 A1* | 4/2019 | Mcginley | ............... | B63H 25/42 |
| 2019/0137993 A1* | 5/2019 | Bertrand | ................ | B63H 25/02 |
| 2019/0179318 A1* | 6/2019 | Miller | .................... | B63H 25/42 |
| 2019/0353093 A1* | 11/2019 | Ito | .......................... | B63H 20/12 |
| 2021/0129963 A1 | 5/2021 | Sargazikoosheh | | |
| 2021/0139123 A1* | 5/2021 | Osara | .................... | B63H 21/14 |
| 2021/0141396 A1* | 5/2021 | Kinoshita | ............ | G05D 1/0875 |
| 2021/0371074 A1* | 12/2021 | Lammers-Meis | ...... | B63H 5/125 |
| 2022/0014036 A1* | 1/2022 | Gonring | ............... | H02J 7/1423 |
| 2022/0258845 A1* | 8/2022 | Sawano | ................ | B63H 21/20 |
| 2023/0020778 A1* | 1/2023 | Sawano | ................ | B63H 23/30 |

FOREIGN PATENT DOCUMENTS

| | | | |
|---|---|---|---|
| JP | 2015047899 A | * | 3/2015 |
| JP | 6156926 B2 | | 7/2017 |
| JP | 2018-90045 A | | 6/2018 |
| JP | 2019-199148 A | | 11/2019 |

* cited by examiner

OUTPUT

T11

T2

T21

T20

T1

T10

T12

T22

ELECTRIC
MOTOR OF
AUXILIARY
PROPULSION
DEVICE

ENGINE
OF MAIN
PROPULSION
DEVICE

[COMPARATIVE EXAMPLE]

MARINE PROPULSION SYSTEM AND MARINE VESSEL

CROSS REFERENCE TO RELATED APPLICATIONS

This application claims the benefit of priority to Japanese Patent Application No. 2021-210439 filed on Dec. 24, 2021. The entire contents of this application are hereby incorporated herein by reference.

BACKGROUND OF THE INVENTION

1. Field of the Invention

The present invention relates to a marine propulsion system and a marine vessel, and more particularly, it relates to a marine propulsion system and a marine vessel that are each able to adjust the thrust of a (the) marine vessel to less than a troll thrust, which is a minimum thrust generated when an engine continuously drives a thruster.

2. Description of the Related Art

A marine vessel that is able to adjust the thrust of the marine vessel to less than a troll thrust, which is a minimum thrust generated when an engine continuously drives a thruster is known in general. Such a marine vessel is disclosed in Japanese Patent No. 6156926, for example.

Japanese Patent No. 6156926 discloses a marine vessel including a vessel body and an outboard motor corresponding to a propulsion unit attached to the vessel body. The outboard motor of the marine vessel disclosed in Japanese Patent No. 6156926 includes a propulsion device (thruster), an engine to generate a thrust from the propulsion device, and a shift actuator to switch the outboard motor between a shift-in state (forward or reverse movement state) and a neutral state. In the marine vessel disclosed in Japanese Patent No. 6156926, the shift-in state and the neutral state of the outboard motor are alternately repeated at predetermined time intervals such that the marine vessel is able to navigate at a speed lower than a speed at which the thrust of the marine vessel becomes a minimum thrust (troll thrust) generated when the engine continuously drives the thruster.

When the marine vessel described in Japanese Patent No. 6156926 navigates at the speed lower than the speed in the troll thrust state, the shift-in state and the neutral state of the outboard motor are alternately repeated at the predetermined time intervals, and thus very small changes in the speed of the marine vessel are repeated. That is, the speed of the marine vessel is not stable when the marine vessel navigates at the speed lower than the speed in the troll thrust state. In addition, the shift-in state and the neutral state of the outboard motor are alternately repeated at the predetermined time intervals, and thus noises and vibrations are repeatedly generated when the outboard motor is switched between the shift-in state and the neutral state. That is, the quietness of the marine vessel is reduced when the marine vessel navigates at the speed lower than the speed in the troll thrust state. Therefore, it is desired to stabilize the speed of the marine vessel and to improve the quietness of the marine vessel when the marine vessel navigates at the speed lower than the speed in the troll thrust state. In the field of marine vessels, from the viewpoint of SDGs (Sustainable Development Goals), it is desired to reduce environmental burdens, such as reducing the amount of carbon dioxide emissions associated with driving of propulsion devices.

SUMMARY OF THE INVENTION

Preferred embodiments of the present invention provide marine propulsion systems and marine vessels that each stabilize the speed of marine vessels and improve the quietness of the marine vessels when the marine vessels navigate at a speed lower than a speed in a troll thrust state, and reduce the amount of carbon dioxide emissions.

A marine propulsion system according to a preferred embodiment of the present invention includes a main propulsion device to be attached to a stern of a hull, including an engine to drive a main thruster to generate a thrust, and operable to rotate in a right-left direction to change a direction of the thrust, an auxiliary propulsion device to be attached to the stern, including an electric motor to drive an auxiliary thruster to generate a thrust, operable to rotate in the right-left direction to change a direction of the thrust, and having a minimum output smaller than a minimum output of the main propulsion device, and a controller configured or programmed to perform an electric drive control to cause the electric motor to drive the auxiliary thruster in the auxiliary propulsion device without performing an engine drive control to cause the engine to drive the main thruster in the main propulsion device when adjusting a thrust of a marine vessel to less than a troll thrust corresponding to a minimum thrust generated when the engine continuously drives the main thruster.

A marine propulsion system according to a preferred embodiment of the present invention includes the controller configured or programmed to perform the electric drive control to cause the electric motor to drive the auxiliary thruster in the auxiliary propulsion device and having a minimum output smaller than the minimum output of the main thruster without performing the engine drive control to cause the engine to drive the main thruster in the main propulsion device when adjusting the thrust of the marine vessel to less than the troll thrust. Accordingly, when the thrust of the marine vessel is adjusted to less than the troll thrust, the electric drive control is performed without performing the engine drive control such that the thrust of the marine vessel is changed to less than the troll thrust without alternately repeating the shift-in state and the neutral state of the main propulsion device at predetermined time intervals. Consequently, the speed of the marine vessel is stabilized when the marine vessel navigates at a speed lower than a speed in the troll thrust state. Furthermore, when the thrust of the marine vessel is adjusted to less than the troll thrust, the shift-in state and the neutral state of the main propulsion device are not alternately repeated at the predetermined time intervals, and thus noises and vibrations are not generated when the main propulsion device is switched between the shift-in state and the neutral state. Consequently, the quietness of the marine vessel is improved when the marine vessel navigates at a speed lower than the speed in the troll thrust state. In addition, unlike the engine, the electric motor does not directly emit carbon dioxide, and thus the electric drive control is performed without performing the engine drive control when the thrust of the marine vessel is adjusted to less than the troll thrust such that the amount of carbon dioxide emissions is reduced as compared with a case in which the engine drive control is performed when the thrust of the marine vessel is adjusted to less than the troll thrust. Consequently, when the marine vessel navigates at a speed lower than the speed in the troll thrust state, the speed of the marine vessel is stabilized, the quietness of the marine vessel is improved, and the amount of carbon dioxide emissions is reduced.

In a marine propulsion system according to a preferred embodiment of the present invention, the main propulsion device is preferably provided on a centerline of the hull in the right-left direction, and the auxiliary propulsion device is preferably provided to one side of the centerline of the hull in the right-left direction. Accordingly, in a structure including the main propulsion device and the auxiliary propulsion device that have different minimum outputs and are not provided symmetrically with each other, when the marine vessel navigates at a speed lower than the speed in the troll thrust state, the speed of the marine vessel is stabilized, the quietness of the marine vessel is improved, and the amount of carbon dioxide emissions is reduced.

In a marine propulsion system according to a preferred embodiment of the present invention, the controller is preferably configured or programmed to perform the electric drive control to continuously drive the auxiliary thruster without performing the engine drive control when adjusting the thrust of the marine vessel to less than the troll thrust. Accordingly, when the thrust of the marine vessel is adjusted to less than the troll thrust, the auxiliary thruster is continuously driven such that the thrust of the marine vessel is stably generated as compared with a case in which the auxiliary thruster is not continuously driven. Consequently, the speed of the marine vessel is reliably stabilized when the marine vessel navigates at a speed lower than the speed in the troll thrust state.

In a marine propulsion system according to a preferred embodiment of the present invention, the controller is preferably configured or programmed to perform the engine drive control without performing the electric drive control, perform both the engine drive control and the electric drive control, or perform the electric drive control without performing the engine drive control when adjusting the thrust of the marine vessel to the troll thrust or more. Accordingly, in a structure in which the engine drive control is performed without performing the electric drive control, both the engine drive control and the electric drive control are performed, or the electric drive control is performed without performing the engine drive control when the thrust of the marine vessel is adjusted to the troll thrust or more, the electric drive control is performed without performing the engine drive control when the thrust of the marine vessel is adjusted to less than the troll thrust.

In a marine propulsion system according to a preferred embodiment of the present invention, the controller is preferably configured or programmed to perform the electric drive control such that any one of a speed of the marine vessel, a rotation speed of the electric motor, and an output of the electric motor becomes a target value when adjusting the thrust of the marine vessel to less than the troll thrust. Accordingly, any one of the speed of the marine vessel, the rotation speed of the electric motor, and the output of the electric motor is easily adjusted as the target value of the thrust of the marine vessel such that the thrust of the marine vessel becomes less than the troll thrust.

In such a case, the controller is preferably configured or programmed to adjust the target value of any one of the speed of the marine vessel, the rotation speed of the electric motor, and the output of the electric motor in a plurality of stages when adjusting the thrust of the marine vessel to less than the troll thrust. Accordingly, any one of the speed of the marine vessel, the rotation speed of the electric motor, and the output of the electric motor is adjusted as the target value of the thrust of the marine vessel in the plurality of stages such that the thrust of the marine vessel is adjusted to a desired value less than the troll thrust.

In a marine propulsion system including the controller configured or programmed to perform the electric drive control such that any one of the speed of the marine vessel, the rotation speed of the electric motor, and the output of the electric motor becomes the target value when adjusting the thrust of the marine vessel to less than the troll thrust, the controller is preferably configured or programmed to perform the electric drive control such that any one of the speed of the marine vessel, the rotation speed of the electric motor, and the output of the electric motor becomes the target value when adjusting the thrust of the marine vessel to less than the troll thrust in an automatic navigation mode in which navigation of the marine vessel is automatically controlled. Accordingly, the marine vessel is automatically navigated while any one of the speed of the marine vessel, the rotation speed of the electric motor, and the output of the electric motor is adjusted as the target value of the thrust of the marine vessel such that the thrust of the marine vessel becomes less than the troll thrust.

In a marine propulsion system according to a preferred embodiment of the present invention, the auxiliary propulsion device is preferably provided to one side of the hull in the right-left direction, and the controller is preferably configured or programmed to perform a rudder angle change control to change a rudder angle of the auxiliary propulsion device by a predetermined angle to one side in the right-left direction of the hull with respect to a forward-rearward direction of the hull so as to move the marine vessel in the forward-rearward direction when the marine vessel is moved in the forward-rearward direction by the electric drive control. Accordingly, when the marine vessel is moved in the forward-rearward direction by the electric drive control, the rudder angle change control is performed such that check helm is automatically performed to reduce or prevent rotation of the marine vessel due to the auxiliary propulsion device being provided to one side of the centerline of the hull in the right-left direction. Consequently, when the marine vessel is moved in the forward-rearward direction by the electric drive control, the marine vessel is navigated as intended by a user.

In such a case, the controller is preferably configured or programmed to perform a calibration control to adjust the predetermined angle according to at least one of a shape of the hull, a size of the hull, or attachment positions of the main propulsion device and the auxiliary propulsion device to the hull. Accordingly, the calibration control is performed such that the predetermined angle by which the rudder angle of the auxiliary propulsion device is turned to move the marine vessel in the forward-rearward direction when the marine vessel is moved in the forward-rearward direction by the electric drive control is adjusted according to the shape of the hull, the size of the hull, and/or the attachment positions of the main propulsion device and the auxiliary propulsion device to the hull, etc.

In a marine propulsion system according to a preferred embodiment of the present invention, the main propulsion device is preferably an engine outboard motor including the engine to drive a main propeller corresponding to the main thruster and provided on a centerline of the hull in the right-left direction, and the auxiliary propulsion device is preferably an electric outboard motor including the electric motor to drive an auxiliary propeller corresponding to the auxiliary thruster and provided to one side of the centerline of the hull in the right-left direction. Accordingly, in a structure in which the main propulsion device and the auxiliary propulsion device are an engine outboard motor and an electric outboard motor, respectively, when the marine vessel navigates at a speed lower than the speed in the troll thrust state, the speed of the marine vessel is stabilized, the quietness of the marine vessel is improved, and the amount of carbon dioxide emissions is reduced.

A marine vessel according to a preferred embodiment of the present invention includes a hull and a marine propulsion system provided on or in the hull. The marine propulsion system includes a main propulsion device attached to a stern of the hull, including an engine to drive a main thruster to generate a thrust, and operable to rotate in a right-left direction to change a direction of the thrust, an auxiliary propulsion device attached to the stern, including an electric motor to drive an auxiliary thruster to generate a thrust, operable to rotate in the right-left direction to change a direction of the thrust, and having a minimum output smaller than a minimum output of the main propulsion device, and a controller configured or programmed to perform an electric drive control to cause the electric motor to drive the auxiliary thruster in the auxiliary propulsion device without performing an engine drive control to cause the engine to drive the main thruster in the main propulsion device when adjusting a thrust of the marine vessel to less than a troll thrust corresponding to a minimum thrust generated when the engine continuously drives the main thruster.

A marine vessel according to a preferred embodiment of the present invention includes the controller configured or programmed to perform the electric drive control to cause the electric motor to drive the auxiliary thruster in the auxiliary propulsion device and having a minimum output smaller than the minimum output of the main thruster without performing the engine drive control to cause the engine to drive the main thruster in the main propulsion device when adjusting the thrust of the marine vessel to less than the troll thrust. Accordingly, similarly to the marine propulsion systems according to preferred embodiments of the present invention described above, when the marine vessel navigates at a speed lower than a speed in a troll thrust state, the speed of the marine vessel is stabilized, the quietness of the marine vessel is improved, and the amount of carbon dioxide emissions is reduced.

In a marine vessel according to a preferred embodiment of the present invention, the main propulsion device is preferably provided on a centerline of the hull in the right-left direction, and the auxiliary propulsion device is preferably provided to one side of the centerline of the hull in the right-left direction. Accordingly, similarly to the marine propulsion systems according to preferred embodiments of the present invention described above, in a structure including the main propulsion device and the auxiliary propulsion device that have different minimum outputs and are not provided symmetrically with each other, when the marine vessel navigates at a speed lower than the speed in the troll thrust state, the speed of the marine vessel is stabilized, the quietness of the marine vessel is improved, and the amount of carbon dioxide emissions is reduced.

In a marine vessel according to a preferred embodiment of the present invention, the controller is preferably configured or programmed to perform the electric drive control to continuously drive the auxiliary thruster without performing the engine drive control when adjusting the thrust of the marine vessel to less than the troll thrust. Accordingly, similarly to the marine propulsion systems according to preferred embodiments of the present invention described above, the speed of the marine vessel is reliably stabilized when the marine vessel navigates at a speed lower than the speed in the troll thrust state.

In a marine vessel according to a preferred embodiment of the present invention, the controller is preferably configured or programmed to perform the engine drive control without performing the electric drive control, perform both the engine drive control and the electric drive control, or perform the electric drive control without performing the engine drive control when adjusting the thrust of the marine vessel to the troll thrust or more. Accordingly, similarly to the marine propulsion systems according to preferred embodiments of the present invention described above, in a structure in which the engine drive control is performed without performing the electric drive control, both the engine drive control and the electric drive control are performed, or the electric drive control is performed without performing the engine drive control when the thrust of the marine vessel is adjusted to the troll thrust or more, the electric drive control is performed without performing the engine drive control when the thrust of the marine vessel is adjusted to less than the troll thrust.

In a marine vessel according to a preferred embodiment of the present invention, the controller is preferably configured or programmed to perform the electric drive control such that any one of a speed of the marine vessel, a rotation speed of the electric motor, and an output of the electric motor becomes a target value when adjusting the thrust of the marine vessel to less than the troll thrust. Accordingly, similarly to the marine propulsion systems according to preferred embodiments of the present invention described above, any one of the speed of the marine vessel, the rotation speed of the electric motor, and the output of the electric motor is easily adjusted as the target value of the thrust of the marine vessel such that the thrust of the marine vessel becomes less than the troll thrust.

In such a case, the controller is preferably configured or programmed to adjust the target value of any one of the speed of the marine vessel, the rotation speed of the electric motor, and the output of the electric motor in a plurality of stages when adjusting the thrust of the marine vessel to less than the troll thrust. Accordingly, similarly to the marine propulsion systems according to preferred embodiments of the present invention described above, the thrust of the marine vessel is adjusted to a desired value less than the troll thrust.

In a marine vessel including the controller configured or programmed to perform the electric drive control such that any one of the speed of the marine vessel, the rotation speed of the electric motor, and the output of the electric motor becomes the target value when adjusting the thrust of the marine vessel to less than the troll thrust, the controller is preferably configured or programmed to perform the electric drive control such that any one of the speed of the marine vessel, the rotation speed of the electric motor, and the output of the electric motor becomes the target value when adjusting the thrust of the marine vessel to less than the troll thrust in an automatic navigation mode in which navigation of the marine vessel is automatically controlled. Accordingly, similarly to the marine propulsion systems according to preferred embodiments of the present invention described above, the marine vessel is automatically navigated while any one of the speed of the marine vessel, the rotation speed of the electric motor, and the output of the electric motor is adjusted as the target value of the thrust of the marine vessel such that the thrust of the marine vessel becomes less than the troll thrust.

In a marine vessel according to a preferred embodiment of the present invention, the auxiliary propulsion device is preferably provided to one side of the hull in the right-left direction, and the controller is preferably configured or programmed to perform a rudder angle change control to change a rudder angle of the auxiliary propulsion device by a predetermined angle to one side in the right-left direction of the hull with respect to a forward-rearward direction of the hull so as to move the marine vessel in the forward-rearward direction when the marine vessel is moved in the forward-rearward direction by the electric drive control. Accordingly, similarly to the marine propulsion systems according to preferred embodiments of the present invention described above, when the marine vessel is moved in the forward-rearward direction by the electric drive control, the marine vessel is navigated as intended by a user.

In such a case, the controller is preferably configured or programmed to perform a calibration control to adjust the predetermined angle according to at least one of a shape of the hull, a size of the hull, or attachment positions of the main propulsion device and the auxiliary propulsion device to the hull. Accordingly, similarly to the marine propulsion systems according to preferred embodiments of the present invention described above, the predetermined angle by which the rudder angle of the auxiliary propulsion device is turned to move the marine vessel in the forward-rearward direction when the marine vessel is moved in the forward-rearward direction by the electric drive control is adjusted according to the shape of the hull, the size of the hull, and/or the attachment positions of the main propulsion device and the auxiliary propulsion device to the hull, etc.

In a marine vessel according to a preferred embodiment of the present invention, the main propulsion device is preferably an engine outboard motor including the engine to drive a main propeller corresponding to the main thruster and provided on a centerline of the hull in the right-left direction, and the auxiliary propulsion device is preferably an electric outboard motor including the electric motor to drive an auxiliary propeller corresponding to the auxiliary thruster and provided to one side of the centerline of the hull in the right-left direction. Accordingly, similarly to the marine propulsion systems according to preferred embodiments of the present invention described above, in a structure in which the main propulsion device and the auxiliary propulsion device are an engine outboard motor and an electric outboard motor, respectively, when the marine vessel navigates at a speed lower than the speed in the troll thrust state, the speed of the marine vessel is stabilized, the quietness of the marine vessel is improved, and the amount of carbon dioxide emissions is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structures of a marine propulsion system 100 and a marine vessel 110 according to preferred embodiments of the present invention are now described with reference to FIGS. 1 to 10. In the figures, arrow FWD represents the front of the marine vessel 110, arrow BWD represents the rear of the marine vessel 110, arrow L represents the left (port side) of the marine vessel 110, and arrow R represents the right (starboard side) of the marine vessel 110.

Figure 1:
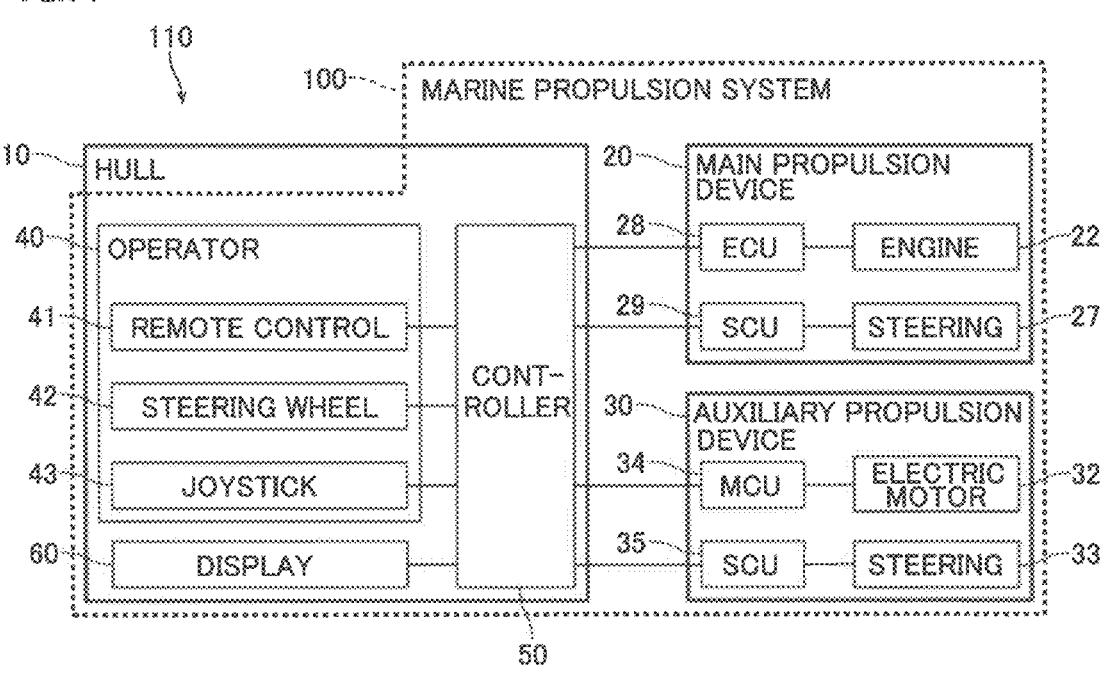
FIG. 1 is a block diagram showing a marine propulsion system according to a preferred embodiment of the present invention.

As shown in FIG. 1, the marine vessel 110 includes a hull 10 and the marine propulsion system 100. The marine propulsion system 100 is provided on or in the hull 10. The marine propulsion system 100 propels the marine vessel 110. The marine vessel 110 may be a relatively small marine vessel used for sightseeing or fishing, for example.

The marine propulsion system 100 includes a main propulsion device 20, an auxiliary propulsion device 30, an operator 40, a controller 50, and a display 60. The operator 40, the controller 50, and the display 60 are provided on or in the hull 10.

Figure 2:
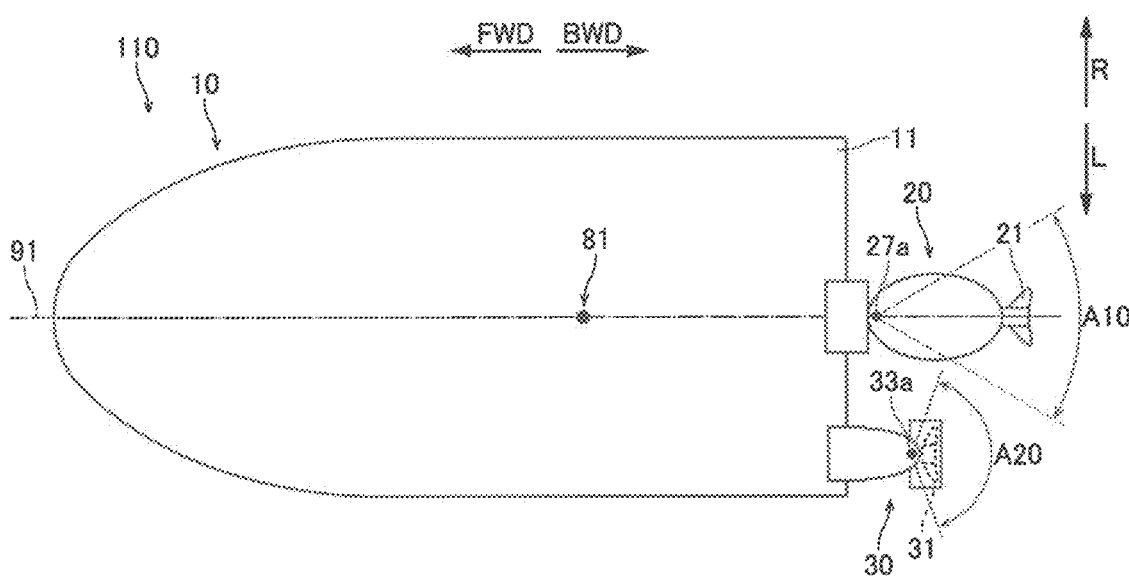
FIG. 2 is a schematic view showing a marine vessel according to a preferred embodiment of the present invention.

As shown in FIG. 2, only one main propulsion device 20 is attached to a stern 11 of the hull 10. That is, the main propulsion device 20 is an outboard motor. The main propulsion device 20 is located on a centerline 91 of the hull 10 in a right-left direction. The centerline 91 of the hull 10 in the right-left direction extends through the center of gravity 81 of the hull 10.

Figure 3:
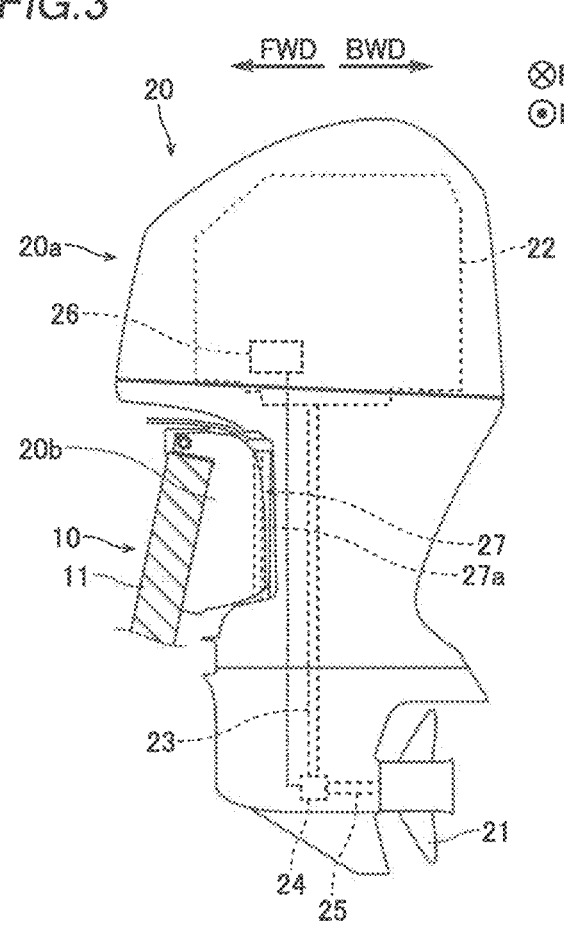
FIG. 3 is a side view showing a main propulsion device of a marine vessel according to a preferred embodiment of the present invention.

As shown in FIG. 3, the main propulsion device 20 includes a main propulsion device body 20a and a bracket 20b. The main propulsion device body 20a is attached to the stern 11 of the hull 10 via the bracket 20b.

The main propulsion device 20 includes an engine 22 to drive a main propeller 21 to generate a thrust. That is, the main propulsion device 20 is an engine outboard motor including the engine 22 to drive the main propeller 21. Specifically, the main propulsion device body 20a includes the engine 22, a drive shaft 23, a gearing 24, a propeller shaft 25, and the main propeller 21. The engine 22 is an internal combustion engine that generates a driving force. The driving force of the engine 22 is transmitted to the main propeller 21 via the drive shaft 23, the gearing 24, and the propeller shaft 25. The main propeller 21 generates a thrust by rotating in the water by the driving force transmitted from the engine 22. The main propeller 21 is an example of a "main thruster".

The main propulsion device body 20a includes a shift actuator 26 to switch the shift state (the forward movement state, the reverse movement state, or the neutral state) of the main propulsion device 20. The shift actuator 26 switches the shift state of the main propulsion device 20 between the forward movement state (shift-in state), the reverse movement state (shift-in state), and the neutral state by switching the meshing of the gearing 24. In the forward movement state, a driving force is transmitted from the engine 22 to the main propeller 21 to generate a forward thrust from the main propeller 21. In the reverse movement state, a driving force is transmitted from the engine 22 to the main propeller 21 to generate a reverse thrust from the main propeller 21. In the neutral state, a driving force is not transmitted from the engine 22 to the main propeller 21 in order to not generate a thrust from the main propeller 21. In the main propulsion device 20, when the shift state of the main propulsion device 20 is switched, the gearing 24 generates relatively loud noises and vibrations.

The main propulsion device 20 rotates in the right-left direction to change the direction of a thrust. Specifically, a steering 27 is provided on the bracket 20b. The steering 27 includes a steering shaft 27a that extends in an upward-downward direction. The main propulsion device body 20a is rotated in the right-left direction by the steering 27 about the steering shaft 27a with respect to the bracket 20b. When the main propulsion device body 20a rotates in the right-left direction about the steering shaft 27a, the orientation of the main propeller 21 also rotates in the right-left direction. Thus, the direction of the thrust of the main propeller 21 is changed. In the following description, changing the direction of the thrust of the main propeller 21 by rotating the orientation of the main propeller 21 in the right-left direction is referred to as "steering the main propulsion device 20".

As shown in FIG. 2, the main propulsion device 20 is steerable by about 30 degrees to each of the L side and the R side. That is, a steering angle range A10, which is an angular range in which the main propulsion device 20 is steerable, is about 60 degrees.

As shown in FIG. 1, the main propulsion device 20 includes an engine control unit (ECU) 28 and a steering control unit (SCU) 29. The ECU 28 controls driving of the engine 22 and driving of the shift actuator 26 based on a control performed by the controller 50. The SCU 29 controls driving of the steering 27 based on a control performed by the controller 50. The ECU 28 and the SCU 29 include a control circuit including a central processing unit (CPU), for example.

As shown in FIG. 2, only one auxiliary propulsion device 30 is attached to the stern 11 of the hull 10. That is, the auxiliary propulsion device 30 is an outboard motor. The auxiliary propulsion device 30 is provided to one side of the centerline of the hull 10 in the right-left direction. In the marine propulsion system 100, the auxiliary propulsion device 30 is provided to the L side of the hull 10.

Figure 4:
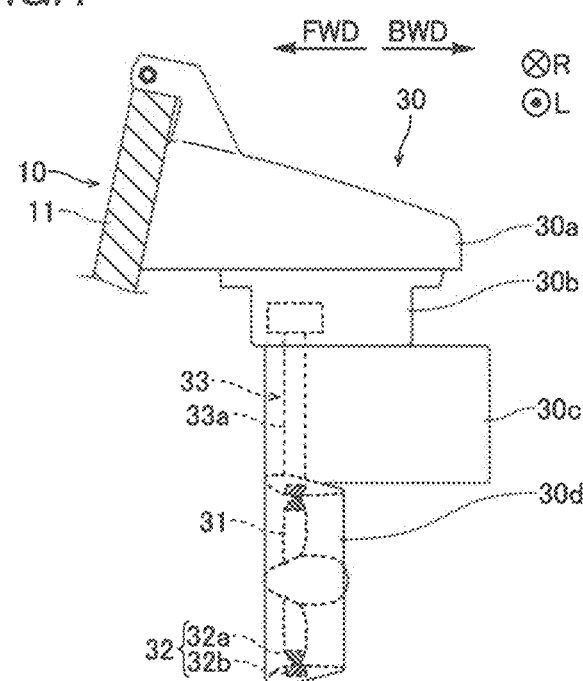
FIG. 4 is a side view showing an auxiliary propulsion device of a marine vessel according to a preferred embodiment of the present invention.

As shown in FIG. 4, the auxiliary propulsion device 30 includes a cowling 30a, an upper case 30b, a lower case 30c, and a duct 30d. The cowling 30a, the upper case 30b, the lower case 30c, and the duct 30d are aligned in this order from top to bottom. The cowling 30a is attached to the stern 11 of the hull 10.

The auxiliary propulsion device 30 includes an electric motor 32 to drive an auxiliary propeller 31 to generate a thrust. That is, the auxiliary propulsion device 30 is an electric outboard motor including the electric motor 32 to drive the auxiliary propeller 31. Specifically, the auxiliary propulsion device 30 includes the electric motor 32 and the auxiliary propeller 31. The electric motor 32 is provided in the duct 30d. The auxiliary propeller 31 is provided in the duct 30d. The electric motor 32 is driven by power supplied from a battery (not shown) provided in the hull 10. The electric motor 32 includes a stator 32a that is integral and unitary with the duct 30d, and a rotor 32b that is integral and unitary with the auxiliary propeller 31. The auxiliary propeller 31 generates a thrust by rotating in the water by a driving force transmitted from the electric motor 32. The auxiliary propeller 31 is an example of an "auxiliary thruster".

When the auxiliary propeller 31 is rotated forward, a forward thrust is generated from the auxiliary propeller 31. That is, when the auxiliary propeller 31 is rotated forward, the shift state of the auxiliary propulsion device 30 becomes a forward movement state. When the auxiliary propeller 31 is rotated backward, a reverse thrust is generated from the auxiliary propeller 31. That is, when the auxiliary propeller 31 is rotated backward, the shift state of the auxiliary propulsion device 30 becomes a reverse movement state. When the auxiliary propeller 31 is stopped, a thrust is not generated from the auxiliary propeller 31. That is, when the auxiliary propeller 31 is stopped, the shift state of the auxiliary propulsion device 30 becomes a neutral state. Therefore, when the shift state (the forward movement state, the reverse movement state, or the neutral state) of the auxiliary propulsion device 30 is changed, the meshing of the gearing 24 (see FIG. 3) is not switched unlike when the shift state of the main propulsion unit 20 (see FIG. 3) is switched. Thus, when the shift state of the auxiliary propulsion device 30 is changed, the auxiliary propulsion device 30 does not generate relatively loud noises or vibrations unlike when the shift state of the main propulsion device 20 is switched.

The auxiliary propulsion device 30 rotates in the right-left direction to change the direction of a thrust. Specifically, a steering 33 is provided in the auxiliary propulsion device 30. The steering 33 includes a steering shaft 33a fixed to the lower case 30c and extending in the upward-downward direction. An upper end of the steering shaft 33a is located in the upper case 30b. A lower end of the steering shaft 33a is fixed to the duct 30d. The duct 30d and the lower case 30c are rotatable in the right-left direction by the steering 33 about the steering shaft 33a with respect to the cowling 30a and the upper case 30b. When the duct 30d rotates in the right-left direction about the steering shaft 33a, the orientation of the auxiliary propeller 31 also rotates in the right-left direction. Thus, the direction of the thrust of the auxiliary propeller 31 is changed. In the following description, changing the direction of the thrust of the auxiliary propeller 31 by rotating the orientation of the auxiliary propeller 31 in the right-left direction is referred to as "steering the auxiliary propulsion device 30".

As shown in FIG. 2, the auxiliary propulsion device 30 is steerable by about 70 degrees to each of the L side and the R side. That is, a steering angle range A20, which is an angular range in which the auxiliary propulsion device 30 is steerable, is about 140 degrees.

As shown in FIG. 1, the auxiliary propulsion device 30 includes a motor control unit (MCU) 34 and a steering control unit (SCU) 35. The MCU 34 and the SCU 35 include a control circuit including a CPU, for example. The MCU 34 controls driving of the electric motor 32 based on a control performed by the controller 50. The SCU 35 controls driving of the steering 33 based on a control performed by the controller 50.

Figures 5, 6:
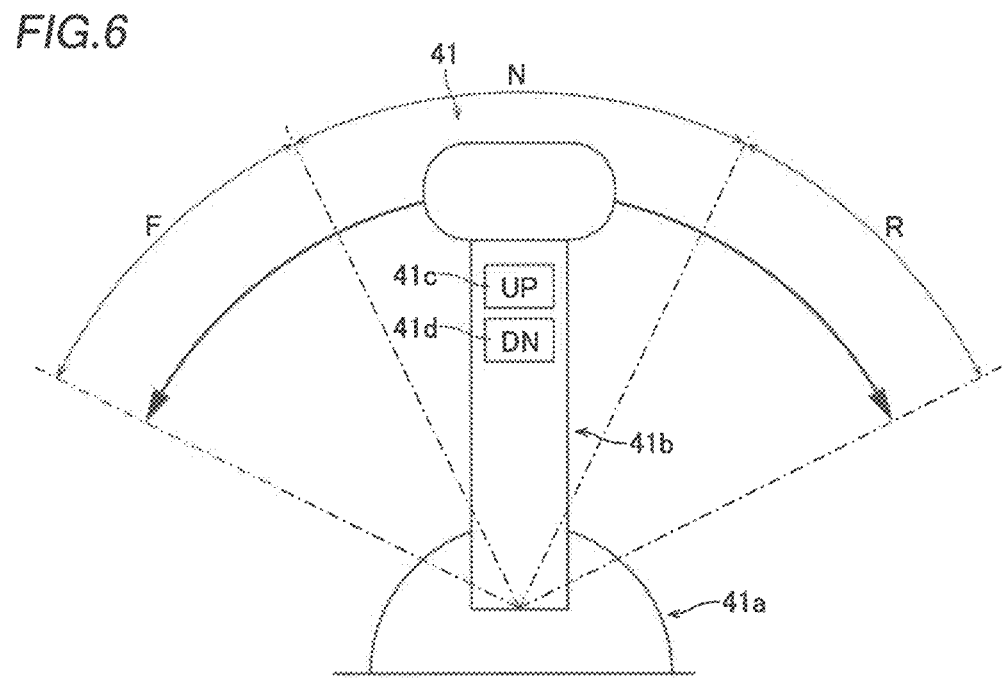
FIG. 5 is a diagram showing a power range of an engine of a main propulsion device and a power range of an electric motor of an auxiliary propulsion device according to a preferred embodiment of the present invention.
FIG. 6 is a diagram showing a remote control of a marine vessel according to a preferred embodiment of the present invention.

As shown in FIG. 5, the minimum output of the auxiliary propulsion device 30 is smaller than that of the main propulsion device 20. Specifically, the maximum value T11 and the minimum value T12 of the power range T10 of the engine 22 of the main propulsion device 20 are larger than the maximum value T21 and the minimum value T22 of the power range T20 of the electric motor 32 of the auxiliary propulsion device 30, respectively. The minimum value T12 of the power range T10 of the engine 22 is smaller than the maximum value T21 of the power range T20 of the electric motor 32. That is, the power range T10 of the engine 22 of the main propulsion device 20 and the power range T20 of the electric motor 32 of the auxiliary propulsion device 30 overlap each other between the maximum value T21 of the power range T20 of the electric motor 32 and the minimum value T12 of the power range T10 of the engine 22.

As shown in FIG. 1, the operator 40 receives a user's operation in order to operate (maneuver) the marine vessel 110. The operator 40 includes a remote control 41, a steering wheel 42, and a joystick 43.

When the marine propulsion system 100 is in a non-joystick mode, an operation on the joystick 43 is not received, but operations on the remote control 41 and the steering wheel 42 are received. When the marine propulsion system 100 is in a joystick mode, operations on the remote control 41 and the steering wheel 42 are not received, but an operation on the joystick 43 is received.

As shown in FIG. 6, the remote control 41 includes a base 41a and a lever 41b. The lever 41b is attached to the base 41a so as to be tiltable in a forward-rearward direction. When the lever 41b is tilted, at least one of the ECU 28 (see FIG. 1) of the main propulsion device 20 (see FIG. 1) or the MCU 34 (see FIG. 1) of the auxiliary propulsion device 30 (see FIG. 1) is controlled by the controller 50 (see FIG. 1).

The position of the lever 41b between a position tilted forward by a predetermined angle and a position tilted rearward by a predetermined angle is set as a neutral position (N) corresponding to the neutral state of the shift state of the main propulsion device 20 (see FIG. 1). The position of the lever 41b tilted forward from the neutral position (N) is set as a forward movement position (F) corresponding to the forward movement state of the shift state of the main propulsion device 20. The position of the lever 41b tilted rearward from the neutral position (N) is set as a reverse movement position (R) corresponding to the reverse movement state of the shift state of the main propulsion device 20. The magnitude of the tilt angle of the lever 41b at the forward movement position (F) and the reverse movement position (R) corresponds to the magnitude of the output T1 (see FIG. 5) of the engine 22 (see FIG. 1) of the main propulsion device 20.

When the lever 41b is operated so as to be located at the neutral position (N) in a manual navigation mode, the controller 50 (see FIG. 1) performs a control such that the shift state of the main propulsion device 20 (see FIG. 1) becomes the neutral state. When the lever 41b is operated so as to be located at the forward movement position (F) in the manual navigation mode, the controller 50 performs a control such that the shift state of the main propulsion device 20 becomes the forward movement state (shift-in state). When the lever 41b is operated so as to be located at the reverse movement position (R) in the manual navigation mode, the controller 50 performs a control such that the shift state of the main propulsion device 20 becomes the reverse movement state (shift-in state). The manual navigation mode refers to an operation mode in which the controller 50 controls navigation of the marine vessel 110 (see FIG. 1) based on a user's operation on the operator 40 (see FIG. 1). For example, the controller 50 performs a control such that the speed V (see FIG. 8) of the marine vessel 110 is changed based on a user's operation to change the tilt angle on the lever 41b. That is, the manual navigation mode is an operation mode in which navigation of the marine vessel 110 is manually controlled.

The remote control 41 includes an UP button 4c and a DOWN button 41d. The UP button 4c and the DOWN button 41d are provided for an automatic navigation mode. The automatic navigation mode refers to an operation mode in which the controller 50 (see FIG. 1) automatically controls navigation of the marine vessel 110 (see FIG. 1) based on a user's operation on the operator 40 (see FIG. 1). For example, the controller 50 performs a control such that the speed V (see FIG. 8) of the marine vessel 110 is maintained at a target value set by the user based on a user's operation on the UP button 4c or the DOWN button 41d in the automatic navigation mode. That is, the automatic navigation mode is an operation mode in which navigation of the marine vessel 110 is automatically controlled.

Specifically, when the DOWN button 41d is pressed in the manual navigation mode, the controller 50 (see FIG. 1) performs a control to transition the navigation mode of the marine vessel 110 (see FIG. 1) from the manual navigation mode to the automatic navigation mode. In the marine propulsion system 100 (see FIG. 1), when the DOWN button 41d is pressed while the lever 41b is located at the forward movement position (F) or the reverse movement position (R), the controller 50 (see FIG. 1) performs a control to transition the navigation mode of the marine vessel 110 from the manual navigation mode to the automatic navigation mode. That is, when the DOWN button 41d is pressed while the lever 41b is located at the neutral position (N), the controller 50 does not perform a control to transition the navigation mode of the marine vessel 110 from the manual navigation mode to the automatic navigation mode.

When the UP button 4c is pressed in the automatic navigation mode, the controller 50 (see FIG. 1) performs a control to increase the thrust P (see FIG. 8) of the marine vessel 110 (see FIG. 1). When the DOWN button 41d is pressed in the automatic navigation mode, the controller 50 performs a control to reduce the thrust P of the marine vessel 110. In the marine propulsion system 100 (see FIG. 1), when the tilt angle of the lever 41b is changed in the automatic navigation mode, the controller 50 performs a control to transition the automatic navigation mode to the manual navigation mode. That is, in the automatic navigation mode, the lever 41b is located at the forward movement position (F) or the reverse movement position (R).

Although not shown, the steering wheel 42 (see FIG. 1) is rotatable. When the steering wheel 42 is rotated, at least one of the SCU 29 (see FIG. 1) of the main propulsion device 20

(see FIG. 1) or the SCU 35 (see FIG. 1) of the auxiliary propulsion device 30 (see FIG. 1) is controlled by the controller 50 (see FIG. 1).

Figure 7:
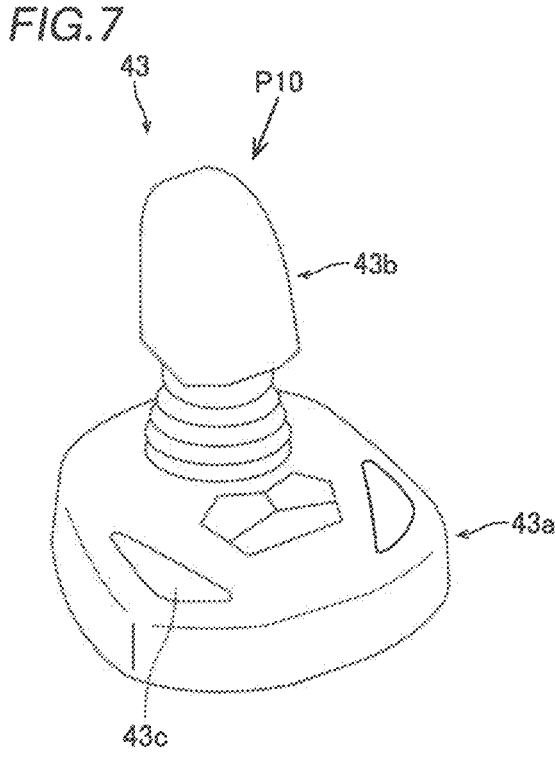
FIG. 7 is a diagram showing a joystick of a marine vessel according to a preferred embodiment of the present invention.

As shown in FIG. 7, the joystick 43 includes a base 43a and a lever 43b. The lever 43b is tiltably and rotatably attached to the base 43a. The lever 43b is urged by an urging member such as a spring to automatically return to a neutral position P10 when not operated by the user. At the neutral position P10, the lever 43b is upright and is not rotated.

When the lever 43b is tilted, at least one of the ECU 28 (see FIG. 1) of the main propulsion device 20 (see FIG. 1), the SCU 29 (see FIG. 1) of the main propulsion device 20, the MCU 34 (see FIG. 1) of the auxiliary propulsion device 30 (see FIG. 1), or the SCU 35 (see FIG. 1) of the auxiliary propulsion device 30 is controlled by the controller 50 (see FIG. 1) such that the marine vessel 110 (see FIG. 1) is translated. When the lever 43b is tilted and rotated, at least one of the ECU 28 of the main propulsion device 20, the SCU 29 of the main propulsion device 20, the MCU 34 of the auxiliary propulsion device 30, or the SCU 35 of the auxiliary propulsion device 30 is controlled by the controller 50 such that the marine vessel 110 is turned. When the lever 43b is rotated, at least one of the ECU 28 of the main propulsion device 20, the SCU 29 of the main propulsion device 20, the MCU 34 of the auxiliary propulsion device 30, or the SCU 35 of the auxiliary propulsion device 30 is controlled by the controller 50 such that the marine vessel 110 is rotated.

A joystick mode switch 43c is provided on the base 43a of the joystick 43. In the marine propulsion system 100, the joystick mode switch 43c is pressed to switch between the joystick mode and the non-joystick mode.

As shown in FIG. 1, the controller 50 controls the ECU 28 of the main propulsion device 20, the SCU 29 of the main propulsion device 20, the MCU 34 of the auxiliary propulsion device 30, and the SCU 29 of the auxiliary propulsion device 30 based on an operation on the operator 40. The controller 50 includes a control circuit including a CPU, for example.

The display 60 displays information on the marine vessel 110. The information on the marine vessel 110 includes the speed V (see FIG. 8) of the marine vessel 110, the output T1 (see FIG. 5) of the engine 22 of the main propulsion device 20, the rotation speed of the engine 22 of the main propulsion device 20, the shift state (the forward movement state, the neutral state, or the reverse movement state) of the main propulsion device 20, the output T2 (see FIG. 5) of the electric motor 32 of the auxiliary propulsion device 30, the rotation speed of the electric motor 32 of the auxiliary propulsion device 30, the shift state of the auxiliary propulsion device 30, and the navigation mode (the manual navigation mode or the automatic navigation mode) of the marine vessel 110, for example. The display 60 is a liquid crystal display, for example.

Figure 8:
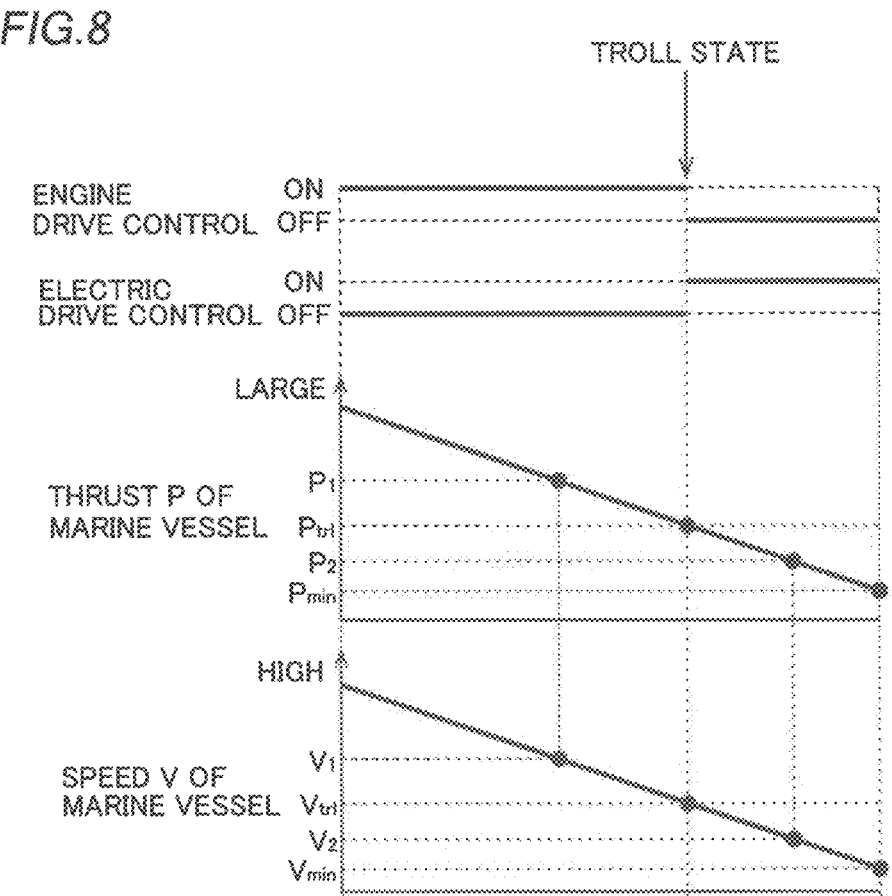
FIG. 8 is a diagram illustrating a relationship between the thrust of a marine vessel, the speed of the marine vessel, and driving of main and auxiliary propulsion drives in a marine propulsion system according to a preferred embodiment of the present invention.

As shown in FIG. 8, the controller 50 (see FIG. 1) performs an engine drive control without performing an electric drive control when adjusting the thrust P of the marine vessel 110 to a troll thrust $P_{trl}$ or more. Furthermore, the controller 50 performs the electric drive control without performing the engine drive control when adjusting the thrust P of the marine vessel 110 to less than the troll thrust $P_{trl}$. The electric drive control refers to a control to cause the electric motor 32 to continuously drive the auxiliary propeller 31 in the auxiliary propulsion device 30. The engine drive control refers to a control to cause the engine 22 to continuously drive the main propeller 21 in the main propulsion device 20. The troll thrust $P_{trl}$ refers to a minimum thrust P generated when the engine 22 continuously drives the main propeller 21.

Figure 9:
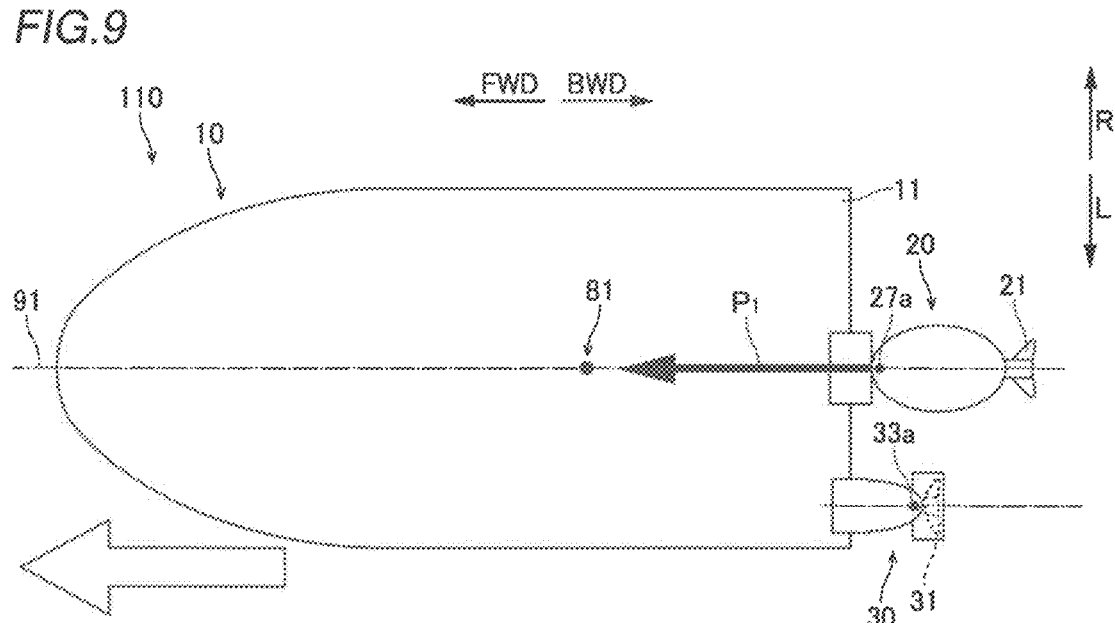
FIG. 9 is a schematic view showing a hull navigating under an engine drive control in a marine propulsion system according to a preferred embodiment of the present invention.

Specifically, as shown in FIG. 9, the controller 50 (see FIG. 1) stops the auxiliary propeller 31 of the auxiliary propulsion device 30 to not generate the output T2 (see FIG. 5) of the auxiliary propulsion device 30 (not generate a thrust from the auxiliary propeller 31) when adjusting the thrust P (see FIG. 8) of the marine vessel 110 to the troll thrust $P_{trl}$ (see FIG. 8) or more. Furthermore, the controller 50 shifts the main propulsion device 20 into the shift-in state (forward or reverse movement state) and generates the output T1 (see FIG. 5) of the main propulsion device 20 (generates a thrust from the main propeller 20) that is equal to or greater than an output in a troll thrust $P_{trl}$ state when adjusting the thrust P of the marine vessel 110 to the troll thrust $P_{trl}$ or more. That is, in the marine propulsion system 100, the thrust P of the marine vessel 110 is obtained from the main propulsion device 20 instead of the auxiliary propulsion device 30 when the marine vessel 110 navigates at a speed higher than a speed V in the troll thrust $P_{trl}$ state (troll speed $V_{trl}$ (see FIG. 8)). FIG. 9 shows a state in which the thrust P of the marine vessel 110 is $P_1$ greater than the troll thrust $P_{trl}$, and the speed V of the marine vessel 110 is $V_1$ (see FIG. 8) higher than the troll speed $V_{trl}$.

Figure 10:
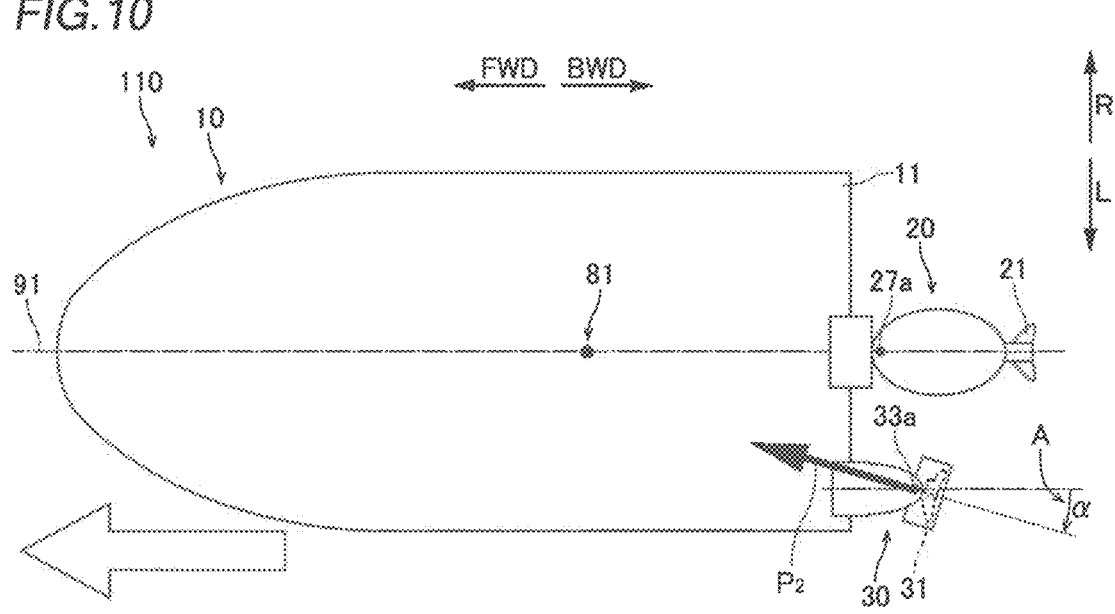
FIG. 10 is a schematic view showing a hull navigating under an electric drive control in a marine propulsion system according to a comparative example of the present invention.

On the other hand, as shown in FIG. 10, the controller 50 (see FIG. 1) shifts the main propulsion device 20 into the neutral state to not generate the output T1 (see FIG. 5) of the main propulsion device 20 (not generate a thrust from the main propeller 21) when adjusting the thrust P (see FIG. 8) of the marine vessel 110 to less than the troll thrust $P_{trl}$ (see FIG. 8). Furthermore, the controller 50 rotates the auxiliary propeller 31 of the auxiliary propulsion device 30 to generate the output T2 (see FIG. 5) of the auxiliary propulsion device 30 (generate a thrust from the auxiliary propeller 31) when adjusting the thrust P of the marine vessel 110 to less than the troll thrust $P_{trl}$. That is, in the marine propulsion system 100, the thrust P of the marine vessel 110 is obtained from the auxiliary propulsion device 30 instead of the main propulsion device 20 when the marine vessel 110 navigates at a speed lower than the speed V in the troll thrust $P_{trl}$ state (troll speed $V_{trl}$ (see FIG. 8)). FIG. 10 shows a state in which the thrust P of the marine vessel 110 is $P_2$ smaller than the troll thrust $P_{trl}$, and the speed V of the marine vessel 110 is $V_2$ (see FIG. 8) lower than the troll speed $V_{trl}$.

As shown in FIG. 8, the controller 50 (see FIG. 1) performs the electric drive control such that any one of the speed V of the marine vessel 110, the rotation speed of the electric motor 32 (see FIG. 1), and the output T2 (see FIG. 5) of the electric motor 32 becomes a target value when adjusting the thrust P of the marine vessel 110 to less than the troll thrust $P_{trl}$ in the automatic navigation mode. In the marine propulsion system 100, a similar control is performed when the thrust P of the marine vessel 110 is adjusted to the troll thrust $P_{trl}$ or more. That is, the controller 50 performs the engine drive control such that any one of the speed V of the marine vessel 110, the rotation speed of the engine 22 (see FIG. 1), and the output T1 (see FIG. 5) of the engine 22 becomes a target value when adjusting the thrust P of the marine vessel 110 to the troll thrust $P_{trl}$ or more.

Specifically, in the automatic navigation mode, the user presses the UP button 4c (see FIG. 6) and the DOWN button 41d (see FIG. 6) of the remote control 41 (see FIG. 6) such that any one of the speed V of the marine vessel 110, the rotation speed of the engine 22 (see FIG. 1), and the output T1 (see FIG. 5) of the engine 22 becomes the target value while checking any one of the speed V of the marine vessel 110, the rotation speed of the engine 22, and the output T1 of the engine 22 displayed on the display 60 (see FIG. 1) when the thrust P of the marine vessel 110 is equal to or greater than the troll thrust $P_{trl}$. After pressing the DOWN button 41$d$ such that the thrust P of the marine vessel 110 is switched from the troll thrust $P_{trl}$ or more to the troll thrust $P_{trl}$ or less, the user presses the UP button 4$c$ and the DOWN button 41$d$ of the remote control 41 such that any one of the speed V of the marine vessel 110, the rotation speed of the electric motor 32, and the output T2 of the electric motor 32 becomes the target value while checking any one of the speed V of the marine vessel 110, the rotation speed of the electric motor 32, and the output T2 of the electric motor 32 displayed on the display 60 in a state in which the thrust P of the marine vessel 110 is less than the troll thrust $P_{trl}$.

The controller 50 is able to adjust the target value of any one of the speed V of the marine vessel 110, the rotation speed of the electric motor 32 (see FIG. 1), and the output T2 (see FIG. 5) of the electric motor 32 in a plurality of stages when adjusting the thrust P of the marine vessel 110 to less than the troll thrust $P_{trl}$. Specifically, in the marine propulsion system 100, the thrust P of the marine vessel 110 is settable in ten stages between the troll thrust $P_{trl}$ and a minimum thrust $P_{min}$. In other words, the speed V of the marine vessel 110 is settable in ten stages between the troll speed $V_{trl}$ and a minimum speed $V_{min}$, for example.

Figure 11:
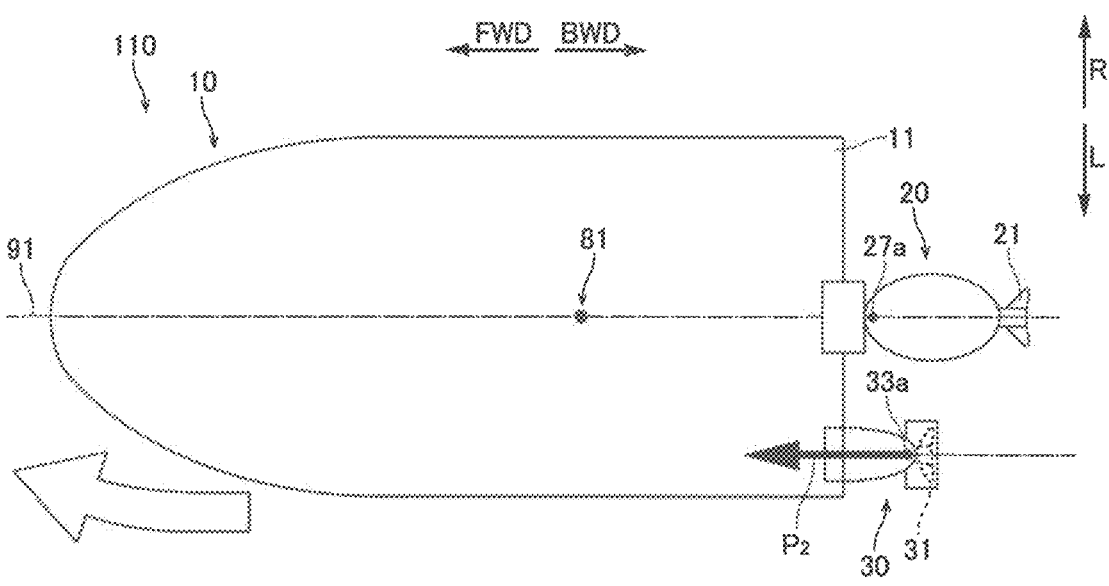
FIG. 11 is a schematic view showing a hull navigating under an electric drive control in a marine propulsion system according to a comparative example of the present invention.

As shown in FIG. 10, the controller 50 (see FIG. 1) performs a rudder angle change control to change the rudder angle A of the auxiliary propulsion device 30 by a predetermined angle $\alpha$ to one side (L side) in the right-left direction of the hull 10 with respect to the forward-rearward direction of the hull 10 so as to move the marine vessel 110 in the forward-rearward direction when the marine vessel 110 is moved in the forward-rearward direction by the electric drive control. Specifically, the auxiliary propulsion device 30 is provided to one side of the centerline of the hull 10 in the right-left direction, and thus the marine vessel 110 is turned when a thrust P is generated in the forward-rearward direction from the auxiliary propulsion device 30 as in a comparative example shown in FIG. 11. Therefore, as shown in FIG. 10, the rudder angle change control is performed to change the rudder angle A of the auxiliary propulsion device 30 by the predetermined angle $\alpha$ to one side (L side) in the right-left direction of the hull 10 with respect to the forward-rearward direction of the hull 10 such that the rudder angle A of the auxiliary propulsion device 30 is changed to generate a thrust from the auxiliary propulsion device 30 so as to move the marine vessel 110 in the forward-rearward direction.

The predetermined angle $\alpha$ that causes the auxiliary propulsion device 30 to generate a thrust to move the marine vessel 110 in the forward-rearward direction varies depending on the shape and size of the hull 10, the attachment position of the auxiliary propulsion device 30 to the hull 10, etc. Therefore, the controller 50 (see FIG. 1) performs a calibration control to adjust the predetermined angle $\alpha$ according to the hull 10. Specifically, in the marine vessel 110 in which the calibration control is not performed, the user operates the operator 40 to move the marine vessel 110 in the forward-rearward direction. Then, while the marine vessel 110 is moved in the forward-rearward direction, an operation is performed (a calibration button is pressed, for example) to memorize the state of the operator 40. After that, when the operator 40 is operated to move the marine vessel 110 in the forward-rearward direction, the controller 50 performs the rudder angle change control to change the rudder angle A of the auxiliary propulsion device 30 by a calibrated predetermined angle $\alpha$ with respect to the marine vessel 110.

According to the various preferred embodiments of the present invention described above, the following advantageous effects are achieved.

According to a preferred embodiment of the present invention, the marine propulsion system 100 (marine vessel 110) includes the controller 50 configured or programmed to perform the electric drive control to cause the electric motor 32 in the auxiliary propulsion device 30 to drive the auxiliary propeller 31 having a minimum output smaller than the minimum output of the main propeller 21 without performing the engine drive control to cause the engine 22 to drive the main propeller 21 in the main propulsion device 20 when adjusting the thrust P of the marine vessel 110 to less than the troll thrust $P_{trl}$. Accordingly, when the thrust P of the marine vessel 110 is adjusted to less than the troll thrust $P_{trl}$, the electric drive control is performed without performing the engine drive control such that the thrust P of the marine vessel 110 is changed to less than the troll thrust $P_{trl}$ without alternately repeating the shift-in state and the neutral state of the main propulsion device 20 at predetermined time intervals. Consequently, the speed V of the marine vessel 110 is stabilized when the marine vessel 110 navigates at a speed lower than the speed V in the troll thrust $P_{trl}$ state (troll speed $V_{trl}$). Furthermore, when the thrust P of the marine vessel 110 is adjusted to less than the troll thrust $P_{trl}$, the shift-in state and the neutral state of the main propulsion device 20 are not alternately repeated at the predetermined time intervals, and thus noises and vibrations are not generated when the main propulsion device 20 is switched between the shift-in state and the neutral state. Consequently, the quietness of the marine vessel 110 is improved when the marine vessel 110 navigates at a speed lower than the speed V in the troll thrust $P_{trl}$ state (troll speed $V_{trl}$). In addition, unlike the engine 22, the electric motor 32 does not directly emit carbon dioxide, and thus the electric drive control is performed without performing the engine drive control when the thrust P of the marine vessel 110 is adjusted to less than the troll thrust $P_{trl}$ such that the amount of carbon dioxide emissions is reduced as compared with a case in which the engine drive control is performed when the thrust P of the marine vessel 110 is adjusted to less than the troll thrust $P_{trl}$. Consequently, when the marine vessel 110 navigates at a speed lower than the speed V in the troll thrust $P_{trl}$ state (troll speed $V_{trl}$), the speed V of the marine vessel 110 is stabilized, the quietness of the marine vessel 110 is improved, and the amount of carbon dioxide emissions is reduced.

According to a preferred embodiment of the present invention, the main propulsion device 20 is provided on the centerline 91 of the hull 10 in the right-left direction. Furthermore, the auxiliary propulsion device 30 is provided to one side of the centerline of the hull 10 in the right-left direction. Accordingly, in a structure including the main propulsion device 20 and the auxiliary propulsion device 30 that have different minimum outputs and are not provided symmetrically with each other, when the marine vessel 110 navigates at a speed lower than the speed V in the troll thrust $P_{trl}$ state (troll speed $V_{trl}$), the speed V of the marine vessel 110 is stabilized, the quietness of the marine vessel 110 is improved, and the amount of carbon dioxide emissions is reduced.

According to a preferred embodiment of the present invention, the controller 50 is configured or programmed to perform the electric drive control to continuously drive the auxiliary propeller 31 without performing the engine drive control when adjusting the thrust P of the marine vessel 110 to less than the troll thrust $P_{trl}$. Accordingly, when the thrust P of the marine vessel 110 is adjusted to less than the troll thrust $P_{trl}$, the auxiliary propeller 31 is continuously driven such that the thrust P of the marine vessel 110 is stably generated as compared with a case in which the auxiliary propeller 31 is not continuously driven. Consequently, the speed V of the marine vessel 110 is reliably stabilized when the marine vessel 110 navigates at a speed lower than the speed V in the troll thrust $P_{trl}$ state (troll speed $V_{trl}$).

According to a preferred embodiment of the present invention, the controller 50 is configured or programmed to perform the engine drive control without performing the electric drive control when adjusting the thrust P of the marine vessel 110 to the troll thrust $P_{trl}$ or more. Accordingly, in a structure in which the engine drive control is performed without performing the electric drive control when the thrust P of the marine vessel 110 is adjusted to the troll thrust $P_{trl}$ or more, the electric drive control is performed without performing the engine drive control when the thrust P of the marine vessel 110 is adjusted to less than the troll thrust $P_{trl}$.

According to a preferred embodiment of the present invention, the controller 50 is configured or programmed to perform the electric drive control such that any one of the speed V of the marine vessel 110, the rotation speed of the electric motor 32, and the output T2 of the electric motor 32 becomes the target value when adjusting the thrust P of the marine vessel 110 to less than the troll thrust $P_{trl}$. Accordingly, any one of the speed V of the marine vessel 110, the rotation speed of the electric motor 32, and the output T2 of the electric motor 32 is easily adjusted as the target value of the thrust P of the marine vessel 110 such that the thrust P of the marine vessel 110 becomes less than the troll thrust $P_{trl}$.

According to a preferred embodiment of the present invention, the controller 50 is configured or programmed to adjust the target value of any one of the speed V of the marine vessel 110, the rotation speed of the electric motor 32, and the output T2 of the electric motor 32 in a plurality of stages when adjusting the thrust P of the marine vessel 110 to less than the troll thrust $P_{trl}$. Accordingly, any one of the speed V of the marine vessel 110, the rotation speed of the electric motor 32, and the output T2 of the electric motor 32 is adjusted as the target value of the thrust P of the marine vessel 110 in the plurality of stages such that the thrust P of the marine vessel 110 is adjusted to a desired value less than the troll thrust $P_{trl}$.

According to a preferred embodiment of the present invention, the controller 50 is configured or programmed to perform the electric drive control such that any one of the speed V of the marine vessel 110, the rotation speed of the electric motor 32, and the output T2 of the electric motor 32 becomes the target value when adjusting the thrust P of the marine vessel 110 to less than the troll thrust $P_{trl}$ in the automatic navigation mode in which navigation of the marine vessel 110 is automatically controlled. Accordingly, the marine vessel 110 is automatically navigated while any one of the speed V of the marine vessel 110, the rotation speed of the electric motor 32, and the output T2 of the electric motor 32 is adjusted as the target value of the thrust P of the marine vessel 110 such that the thrust P of the marine vessel 110 becomes less than the troll thrust $P_{trl}$.

According to a preferred embodiment of the present invention, the auxiliary propulsion device 30 is provided to one side of the centerline of the hull 10 in the right-left direction. Furthermore, the controller 50 is configured or programmed to perform the rudder angle change control to change the rudder angle A of the auxiliary propulsion device 30 by the predetermined angle α to one side in the right-left direction of the hull 10 with respect to the forward-rearward direction of the hull 10 so as to move the marine vessel 110 in the forward-rearward direction when the marine vessel 110 is moved in the forward-rearward direction by the electric drive control. Accordingly, when the marine vessel 110 is moved in the forward-rearward direction by the electric drive control, the rudder angle change control is performed such that check helm is automatically performed to reduce or prevent rotation of the marine vessel 110 due to the auxiliary propulsion device 30 being provided to one side of the centerline of the hull 10 in the right-left direction. Consequently, when the marine vessel 110 is moved in the forward-rearward direction by the electric drive control, the marine vessel 110 is navigated as intended by the user.

According to a preferred embodiment of the present invention, the controller 50 is configured or programmed to perform the calibration control to adjust the predetermined angle α according to the marine vessel 110. Accordingly, the calibration control is performed such that the predetermined angle α by which the rudder angle A of the auxiliary propulsion device 30 is turned to move the marine vessel 110 in the forward-rearward direction when the marine vessel 110 is moved in the forward-rearward direction by the electric drive control is adjusted according to the shape and size of the hull 10, the attachment positions of the main propulsion device 20 and the auxiliary propulsion device 30 to the hull 10, etc.

According to a preferred embodiment of the present invention, the main propulsion device 20 is an engine outboard motor including the engine 22 to drive the main propeller 21 corresponding to a main thruster and provided on the centerline 91 of the hull 10 in the right-left direction. The auxiliary propulsion device 30 is an electric outboard motor including the electric motor 32 to drive the auxiliary propeller 31 corresponding to an auxiliary thruster and provided to one side of the centerline 91 of the hull 10 in the right-left direction. Accordingly, in a structure in which the main propulsion device 20 and the auxiliary propulsion device 30 are an engine outboard motor and an electric outboard motor, respectively, when the marine vessel 110 navigates at a speed lower than the speed V in the troll thrust $P_{trl}$ state (troll speed $V_{trl}$), the speed V of the marine vessel 110 is stabilized, the quietness of the marine vessel 110 is improved, and the amount of carbon dioxide emissions is reduced.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the main propulsion device 20 is preferably an engine outboard motor, and the auxiliary propulsion device 30 is preferably an electric outboard motor in preferred embodiments described above, the present invention is not restricted to this. In a preferred embodiment of the present invention, the main propulsion device and the auxiliary propulsion device may alternatively be inboard motors enclosed within the hull instead of outboard motors, or inboard-outboard motors partially enclosed within the hull.

While the controller 50 preferably performs the calibration control to adjust the predetermined angle α according to the marine vessel 110 in preferred embodiments described above, the present invention is not restricted to this. In a preferred embodiment of the present invention, the controller may not perform the calibration control to adjust the predetermined angle according to the marine vessel. In such a case, in the marine propulsion system, the rudder angle of the auxiliary propulsion device may be manually set by the user when the marine vessel is moved in the forward-rearward direction by the electric drive control, for example.

While the controller 50 preferably performs the rudder angle change control to change the rudder angle A of the auxiliary propulsion device 30 by the predetermined angle α to one side in the right-left direction of the hull 10 with respect to the forward-rearward direction of the hull 10 so as to move the marine vessel 110 in the forward-rearward direction when the marine vessel 110 is moved in the forward-rearward direction by the electric drive control in preferred embodiments described above, the present invention is not restricted to this. In a preferred embodiment of the present invention, the controller may not perform the rudder angle change control to change the rudder angle of the auxiliary propulsion device by the predetermined angle to one side in the right-left direction of the hull with respect to the forward-rearward direction of the hull so as to move the marine vessel in the forward-rearward direction when the marine vessel is moved in the forward-rearward direction by the electric drive control. In such a case, in the marine propulsion system, the marine vessel may be moved in the forward-rearward direction by the electric drive control by a user's manual operation, for example.

While the controller 50 preferably performs a control to transition the navigation mode from the manual navigation mode to the automatic navigation mode when the DOWN button 41d is pressed in the manual navigation mode in preferred embodiments described above, the present invention is not restricted to this. In a preferred embodiment of the present invention, the controller may alternatively perform a control to transition the navigation mode from the manual navigation mode to the automatic navigation mode when a portion (such as the UP button, a portion of the remote control lever other than the DOWN button and the UP button, or an operator other than the remote control lever) other than the DOWN button is operated in the manual navigation mode.

While the controller 50 preferably performs a control to maintain the speed V of the marine vessel 110 at the target value set by the user based on a user's operation on the UP button 4c or the DOWN button 41d in the automatic navigation mode in preferred embodiments described above, the present invention is not restricted to this. In a preferred embodiment of the present invention, the controller may alternatively perform a control to maintain the speed of the marine vessel at the target value set by the user based on a user's operation on a portion (such as a portion of the remote control lever other than the DOWN button and the UP button or an operator other than the remote control lever) other than the UP button and the DOWN button in the automatic navigation mode.

While the controller 50 preferably performs the electric drive control such that any one of the speed V of the marine vessel 110, the rotation speed of the electric motor 32, and the output T2 of the electric motor 32 becomes the target value when the thrust P of the marine vessel 110 is adjusted to less than the troll thrust $P_{trl}$ in the automatic navigation mode in which navigation of the marine vessel 110 is automatically controlled in preferred embodiments described above, the present invention is not restricted to this. In a preferred embodiment of the present invention, the controller may alternatively perform the electric drive control such that any one of the speed of the marine vessel, the rotation speed of the electric motor, and the output of the electric motor becomes the target value when the thrust of the marine vessel is adjusted to less than the troll thrust in the manual navigation mode in which the marine vessel is manually navigated.

While the thrust P of the marine vessel 110 is preferably settable in ten stages between the troll thrust $P_{trl}$ and the minimum thrust $P_{min}$ in preferred embodiments described above, the present invention is not restricted to this. In a preferred embodiment of the present invention, the thrust of the marine vessel may alternatively be settable in any of two to nine stages between the troll thrust and the minimum thrust or in eleven or more stages between the troll thrust and the minimum thrust.

While the controller 50 is preferably able to adjust the target value of any one of the speed V of the marine vessel 110, the rotation speed of the electric motor 32, and the output T2 of the electric motor 32 in a plurality of stages when adjusting the thrust P of the marine vessel 110 to less than the troll thrust $P_{trl}$ in preferred embodiments described above, the present invention is not restricted to this. In a preferred embodiment of the present invention, the controller may alternatively be able to adjust the target value of any one of the speed of the marine vessel, the rotation speed of the electric motor, and the output of the electric motor in only one stage when adjusting the thrust of the marine vessel to less than the troll thrust.

While the controller 50 preferably performs the engine drive control without performing the electric drive control when adjusting the thrust P of the marine vessel 110 to the troll thrust $P_{trl}$ or more in preferred embodiments described above, the present invention is not restricted to this. In a preferred embodiment of the present invention, the controller may alternatively perform both the engine drive control and the electric drive control or may alternatively perform the electric drive control without performing the engine drive control when adjusting the thrust of the marine vessel to the troll thrust or more.

While the auxiliary propulsion device 30 is preferably provided to the L side (port side) of the hull 10 in preferred embodiments described above, the present invention is not restricted to this. In a preferred embodiment of the present invention, the auxiliary propulsion device may alternatively be provided to the starboard side of the hull.

While the main propulsion device 20 is preferably provided on the centerline 91 of the hull 10 in the right-left direction, and the auxiliary propulsion device 30 is preferably provided to one side of the centerline of the hull 10 in the right-left direction in preferred embodiments described above, the present invention is not restricted to this. In a preferred embodiment of the present invention, the main propulsion device may alternatively be provided to one side of the centerline of the hull in the right-left direction, and the auxiliary propulsion device may alternatively be provided on the centerline of the hull in the right-left direction.

While only one main propulsion device 20 is preferably attached to the stern 11 of the hull 10 in preferred embodiments described above, the present invention is not restricted to this. In a preferred embodiment of the present invention, two or more main propulsion devices may alternatively be attached to the stern of the hull.

While only one auxiliary propulsion device 30 is preferably attached to the stern 11 of the hull 10 in preferred embodiments described above, the present invention is not restricted to this. In a preferred embodiment of the present invention, two or more auxiliary propulsion devices may alternatively be attached to the stern of the hull.

While the main propulsion device 20 is preferably steerable by about 30 degrees to each of the L side (the port side of the marine vessel 110) and the R side (the starboard side of the marine vessel 110) in preferred embodiments described above, the present invention is not restricted to this. In a preferred embodiment of the present invention, the main propulsion device may alternatively be steerable by an angle other than about 30 degrees to each of the port side and the starboard side of the marine vessel.

While the auxiliary propulsion device 30 is preferably steerable by about 70 degrees to each of the L side (the port side of the marine vessel 110) and the R side (the starboard side of the marine vessel 110) in preferred embodiments described above, the present invention is not restricted to this. In a preferred embodiment of the present invention, the auxiliary propulsion device may alternatively be steerable by an angle other than about 70 degrees to each of the port side and the starboard side of the marine vessel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion system comprising:
   a main propulsion device to be attached to a stern of a hull, including an engine to drive a main thruster to generate a first thrust, and operable to rotate in a right-left direction to change a direction of the first thrust;
   an auxiliary propulsion device to be attached to the stern, including an electric motor to drive an auxiliary thruster to generate a second thrust, operable to rotate in the right-left direction to change a direction of the second thrust, and having a minimum output smaller than a minimum output of the main propulsion device;
   an operator to receive a user's operation to adjust a speed of a marine vessel; and
   a controller configured or programmed to perform an electric drive control to cause the electric motor to drive the auxiliary thruster in the auxiliary propulsion device without performing an engine drive control to cause the engine to drive the main thruster in the main propulsion device when adjusting a thrust of the marine vessel to less than a troll thrust corresponding to a minimum thrust generated when the engine continuously drives the main thruster, and to perform the engine drive control without performing the electric drive control when adjusting the thrust of the marine vessel to the troll thrust or more, when adjusting the speed of the marine vessel by the user's operation on the operator; wherein
   the main thruster is configured to be driven by the engine in the main propulsion device, and not to be driven by the electric motor in the auxiliary propulsion device;
   the auxiliary thruster is configured to be driven by the electric motor in the auxiliary propulsion device, and not to be driven by the engine in the main propulsion device; and
   the controller is configured or programmed to shift automatically to a state in which the engine drive control is not performed and the electric drive control is performed when the thrust of the marine vessel is changed from a state equal to or greater than the troll thrust to a state less than the troll thrust when adjusting the speed of the marine vessel by the user's operation on the operator.

2. The marine propulsion system according to claim 1, wherein
   the main propulsion device is provided on a centerline of the hull in the right-left direction; and
   the auxiliary propulsion device is provided to one side of the centerline of the hull in the right-left direction.

3. The marine propulsion system according to claim 1, wherein the controller is configured or programmed to perform the electric drive control to continuously drive the auxiliary thruster without performing the engine drive control when adjusting the thrust of the marine vessel to less than the troll thrust.

4. The marine propulsion system according to claim 1, wherein the controller is configured or programmed to perform the electric drive control such that any one of a speed of the marine vessel, a rotation speed of the electric motor, and an output of the electric motor becomes a target value when adjusting the thrust of the marine vessel to less than the troll thrust.

5. The marine propulsion system according to claim 4, wherein the controller is configured or programmed to adjust the target value of any one of the speed of the marine vessel, the rotation speed of the electric motor, and the output of the electric motor in a plurality of stages when adjusting the thrust of the marine vessel to less than the troll thrust.

6. The marine propulsion system according to claim 4, wherein the controller is configured or programmed to perform the electric drive control such that any one of the speed of the marine vessel, the rotation speed of the electric motor, and the output of the electric motor becomes the target value when adjusting the thrust of the marine vessel to less than the troll thrust in an automatic navigation mode in which navigation of the marine vessel is automatically controlled.

7. The marine propulsion system according to claim 1, wherein
   the auxiliary propulsion device is provided to one side of the hull in the right-left direction; and
   the controller is configured or programmed to perform a rudder angle change control to change a rudder angle of the auxiliary propulsion device by a predetermined angle to one side in the right-left direction of the hull with respect to a forward-rearward direction of the hull so as to move the marine vessel in the forward-rearward direction when the marine vessel is moved in the forward-rearward direction by the electric drive control.

8. The marine propulsion system according to claim 7, wherein the controller is configured or programmed to perform a calibration control to adjust the predetermined angle according to at least one of a shape of the hull, a size of the hull, or attachment positions of the main propulsion device and the auxiliary propulsion device to the hull.

9. The marine propulsion system according to claim 1, wherein
   the main propulsion device is an engine outboard motor including the engine to drive a main propeller corresponding to the main thruster and provided on a centerline of the hull in the right-left direction; and
   the auxiliary propulsion device is an electric outboard motor including the electric motor to drive an auxiliary propeller corresponding to the auxiliary thruster and provided to one side of the centerline of the hull in the right-left direction.

10. A marine vessel comprising:
a hull; and
a marine propulsion system provided on or in the hull; wherein
the marine propulsion system includes:
  a main propulsion device attached to a stern of the hull, including an engine to drive a main thruster to generate a first thrust, and operable to rotate in a right-left direction to change a direction of the first thrust;
  an auxiliary propulsion device attached to the stern, including an electric motor to drive an auxiliary thruster to generate a second thrust, operable to rotate in the right-left direction to change a direction of the second thrust, and having a minimum output smaller than a minimum output of the main propulsion device;
  an operator to receive a user's operation to adjust a speed of the marine vessel; and
  a controller configured or programmed to perform an electric drive control to cause the electric motor to drive the auxiliary thruster in the auxiliary propulsion device without performing an engine drive control to cause the engine to drive the main thruster in the main propulsion device when adjusting a thrust of the marine vessel to less than a troll thrust corresponding to a minimum thrust generated when the engine continuously drives the main thruster, and to perform the engine drive control without performing the electric drive control when adjusting the thrust of the marine vessel to the troll thrust or more, when adjusting the speed of the marine vessel by the user's operation on the operator;
the main thruster is configured to be driven by the engine in the main propulsion device, and not to be driven by the electric motor in the auxiliary propulsion device;
the auxiliary thruster is configured to be driven by the electric motor in the auxiliary propulsion device, and not to be driven by the engine in the main propulsion device; and
the controller is configured or programmed to shift automatically to a state in which the engine drive control is not performed and the electric drive control is performed when the thrust of the marine vessel is changed from a state equal to or greater than the troll thrust to a state less than the troll thrust when adjusting the speed of the marine vessel by the user's operation on the operator.

11. The marine vessel according to claim 10, wherein
the main propulsion device is provided on a centerline of the hull in the right-left direction; and
the auxiliary propulsion device is provided to one side of the centerline of the hull in the right-left direction.

12. The marine vessel according to claim 10, wherein the controller is configured or programmed to perform the electric drive control to continuously drive the auxiliary thruster without performing the engine drive control when adjusting the thrust of the marine vessel to less than the troll thrust.

13. The marine vessel according to claim 10, wherein the controller is configured or programmed to perform the electric drive control such that any one of a speed of the marine vessel, a rotation speed of the electric motor, and an output of the electric motor becomes a target value when adjusting the thrust of the marine vessel to less than the troll thrust.

14. The marine vessel according to claim 13, wherein the controller is configured or programmed to adjust the target value of any one of the speed of the marine vessel, the rotation speed of the electric motor, and the output of the electric motor in a plurality of stages when adjusting the thrust of the marine vessel to less than the troll thrust.

15. The marine vessel according to claim 13, wherein the controller is configured or programmed to perform the electric drive control such that any one of the speed of the marine vessel, the rotation speed of the electric motor, and the output of the electric motor becomes the target value when adjusting the thrust of the marine vessel to less than the troll thrust in an automatic navigation mode in which navigation of the marine vessel is automatically controlled.

16. The marine vessel according to claim 10, wherein
the auxiliary propulsion device is provided to one side of the hull in the right-left direction; and
the controller is configured or programmed to perform a rudder angle change control to change a rudder angle of the auxiliary propulsion device by a predetermined angle to one side in the right-left direction of the hull with respect to a forward-rearward direction of the hull so as to move the marine vessel in the forward-rearward direction when the marine vessel is moved in the forward-rearward direction by the electric drive control.

17. The marine vessel according to claim 16, wherein the controller is configured or programmed to perform a calibration control to adjust the predetermined angle according to at least one of a shape of the hull, a size of the hull, or attachment positions of the main propulsion device and the auxiliary propulsion device to the hull.

18. The marine vessel according to claim 10, wherein
the main propulsion device is an engine outboard motor including the engine to drive a main propeller corresponding to the main thruster and provided on a centerline of the hull in the right-left direction; and
the auxiliary propulsion device is an electric outboard motor including the electric motor to drive an auxiliary propeller corresponding to the auxiliary thruster and provided to one side of the centerline of the hull in the right-left direction.

* * * * *